United States Patent
Sexton

(10) Patent No.: US 12,501,866 B2
(45) Date of Patent: *Dec. 23, 2025

(54) SYNTHETIC SOIL SUBSTRATE SYSTEM FOR GROWING A PLANT

(71) Applicant: Atomic Soil, LLC, Tucson, AZ (US)

(72) Inventor: Jay Daniel Sexton, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/974,479

(22) Filed: Dec. 9, 2024

(65) Prior Publication Data

US 2025/0160268 A1    May 22, 2025

Related U.S. Application Data

(63) Continuation of application No. 18/382,526, filed on Oct. 22, 2023, now Pat. No. 12,161,070, which is a continuation of application No. 18/104,855, filed on Feb. 2, 2023, now Pat. No. 11,793,126, which is a
(Continued)

(51) Int. Cl.
    *A01G 24/30* (2018.01)
    *A01G 24/46* (2018.01)
    *A01G 24/48* (2018.01)

(52) U.S. Cl.
    CPC .......... *A01G 24/30* (2018.02); *A01G 24/46* (2018.02); *A01G 24/48* (2018.02)

(58) Field of Classification Search
    CPC ........ A01G 24/30; A01G 24/46; A01G 24/44; A01G 24/12; A01G 24/48
    See application file for complete search history.

(56) References Cited

U.S. PATENT DOCUMENTS

| | | |
|---|---|---|
| 3,513,593 A | 5/1970 | Beck |
| 5,462,390 A | 10/1995 | Sydansk |
| 7,966,767 B2 | 6/2011 | Perriello et al. |

(Continued)

FOREIGN PATENT DOCUMENTS

WO    2012096531 A1    6/2013

OTHER PUBLICATIONS

PCTUS2215118—International Search Report and Written Opinion of the International Search Authority, (USPTO) Apr. 28, 2022.
(Continued)

*Primary Examiner* — Monica L Perry
(74) *Attorney, Agent, or Firm* — Invention To Patent Services; Alex Hobson

(57) ABSTRACT

A synthetic soil substrate system has a plurality of synthetic soil substrate layers that are individually designed to promote plant growth as the roots grow into the layer and as a function of the growth stage. The synthetic soil substrate layers may be planar or may be concentrically arranged with a first synthetic soil substrate ring layer being configured inside of a second synthetic soil substrate ring layer. A synthetic soil substrate has pores that are configured for plant growth and retention and/or deliver of water and growth additives. The average pore size of a first synthetic soil substrate layer may be substantially different from the average pore size of an adjacent synthetic soil substrate layer. Also, the pore structure or shape of the pores may be different between synthetic soil substrate layers, The synthetic soil substrate may have an integral growth additive retained in the pores.

20 Claims, 4 Drawing Sheets

Related U.S. Application Data continuation-in-part of application No. PCT/US2022/015118, filed on Feb. 3, 2022.

(60) Provisional application No. 63/145,395, filed on Feb. 3, 2021.

(56) References Cited

U.S. PATENT DOCUMENTS

| | | |
|---|---|---|
| 8,091,275 B2 | 1/2012 | Bissonnette et al. |
| 9,988,575 B2 | 6/2018 | Vandevelde et al. |
| 10,548,268 B1* | 2/2020 | Lu .................... A01G 25/023 |
| 11,277,979 B2* | 3/2022 | Greetham ............. A01G 18/40 |
| 2008/0034653 A1* | 2/2008 | Ramsey ................. A01G 24/18 |
| | | 47/64 |
| 2009/0056221 A1* | 3/2009 | Ramsey ................. A01G 31/00 |
| | | 65/22 |
| 2010/0050514 A1 | 3/2010 | Wissemeier et al. |
| 2011/0027017 A1 | 2/2011 | Atkin et al. |
| 2011/0308154 A1 | 12/2011 | Akay et al. |
| 2015/0376844 A1 | 12/2015 | Palau Gea et al. |
| 2017/0055470 A1 | 3/2017 | Polivka |
| 2020/0229360 A1 | 7/2020 | Schoener et al. |

OTHER PUBLICATIONS

Behm et al. "Benefits and limitations of three-dimensional printing technology for ecological research" BMC Ecol (2018).

\* cited by examiner

SYNTHETIC SOIL SUBSTRATE SYSTEM FOR GROWING A PLANT

CROSS REFERENCE TO RELATED APPLICATIONS

This application is a continuation of U.S. patent application Ser. No. 18/382,526, filed on Oct. 22, 2023, which is a continuation of U.S. patent application Ser. No. 18/104,855, filed on Feb. 2, 2023 and issued as U.S. Pat. No. 11,793,126 on Oct. 24, 2023, which is a continuation in part of PCT application No. PCT/US2022/015118, filed on Feb. 3, 2022, which claims priority to and the benefit of U.S. Provisional Application No. 63/145,395, filed on Feb. 3, 2021, the entirety of each prior application is incorporated herein by reference.

BACKGROUND OF THE INVENTION

Field of the Invention

The invention is directed to a synthetic soil system that utilizes a synthetic soil assembly of layers of synthetic soil substrates configured to provide an effective pore structure and/or growth additives for the growth stage of the plant as the roots grow into the progressive and different layer.

Background

In general, natural soils contain about 45% inorganic materials, about 5% organic materials, about 25% water and about 25% air. Vital to any given species of plant is the approximate combination of these elements and features with respect to the density of the open spaces with-in the soil. Plant growth media comprising polyurethane absorptive foams are known for use as soil fillers and soil amendments. The foams may be used as substitutes for inorganic materials of the natural soils.

SUMMARY OF THE INVENTION

A synthetic soil substrate system has a plurality of synthetic soil substrate layers that are individually designed to promote plant growth as the roots grow into the layer and as a function of the growth stage. The synthetic soil substrate layers may be planar and extend horizontally with respect to a vertical axis or may be concentrically arranged with a first synthetic soil substrate ring layer being configured inside of a second synthetic soil substrate ring layer. Each layer comprises a synthetic soil substrate that has pores that are configured for plant growth and retention and/or deliver of growth additives. The average pore size of a first synthetic soil substrate layer may be substantially different from the average pore size of an adjacent synthetic soil substrate layer, such as being 20% or more different in average size. Also, the pore structure or shape of the pores may be different between synthetic soil substrate layers, wherein a first synthetic soil substrate layer may have spherical pores and a second synthetic soil substrate layer may have planar or irregularly shaped pores. The synthetic soil substrates may have an integral growth additive that is retained in the pores such as a nutrient or carbon capture material. An additive plug may be configured into the synthetic soil substrate assembly and contain or be a conduit for providing a growth additive, such as a nutrient and/or carbon capture material. An additive plug may extend orthogonally to the synthetic soil substrate planar layers, such as vertically down into the synthetic soil substrate assembly and/or radially into synthetic soil substrate assembly.

A synthetic soil substrate may be a structure that is configured for effectively growing plants and may be a foam, such as an open celled foam to enable root propagation therethrough. A synthetic soil substrate and the arrangement of synthetic soil substrate layers may be configured to deliver water to the plant roots in a more efficient manner and also provide or deliver additives, such as nutrients in an efficient manner to promote better growth of the plant. The water and nutrients may be provided when and where needed as a function of the growth cycle of the plant. A synthetic soil substrate may be a polymeric foam, such as a polyolefin foam. An exemplary polymeric foam is a polyurethane foam, such as an ester-based polyurethane foam or an ether-based polyurethane foam. These types of polyurethane foams may have a polarity that may hold onto water or an additive material in a particular location. The synthetic soil substrate may include an integral growth additive, such as a nutrient and/or a carbon capture material. The synthetic soil substrate has a pore size that is configured to promote plant growth for the stage of the growth cycle when the roots will likely enter into a synthetic soil substrate layer. The average pore size of a first synthetic soil substrate layer may be at least 20% different from the average pore size of a second synthetic soil substrate layer, for example. Also, the pore structure may change through the synthetic soil substrate layers, wherein the pore structure may be spherical in a first layer and more planar or irregular shaped in a second adjacent layer. The average pore size may be measure using a coulter porometer, and may be about 0.1 microns to 1000 microns, or about 0.1 microns or more, about 1.0 micron or more, about 100 microns or more, about 400 microns of more, about 800 microns or more or any range between and including the average pore sizes listed, including from about 0.1 microns to about 800 microns or to about 400 microns, for example. The shapes and sizes of the pores may be optimized to mimic natural soil densities, and may be tailored to specific plant species. For example, clay soils are very dense materials and materials can be manufactured to mimic clay densities using the micron size of the synthetic soil substrate.

A synthetic soil substrate and/or an additive plug may be a customized synthetic soil substrate or customized additive plug, respectively, that is made through a process that specifically controls the pore structure, such as through three-dimensional printing. A three-dimensional printed substrate may be configured with pore structures specifically designed for promoting root growth, nutrient absorption into the roots, carbon capture and the like. For example, carbon capture pore structure may be planar whereas a pore structure for retaining water and nutrients may be more spherical in shape. A three-dimensional printed substrate may be configured with pore structures that are uniform, wherein they are printed to repeat a structure that is the same, such as the same pore size and shape, with no more than 5% difference in the pore size, for example.

A synthetic soil substrate may be hydrophilic of hydrophobic. A synthetic soil substrate may be isotropic or anisotropic through the synthetic soil assembly or within a synthetic soil substrate layer. A synthetic soil substrate may be configured to absorb water, retain and/or direct water to a desired location through anisotropic properties. A synthetic soil substrate may be biodegradable or non-biodegradable substrate material. A synthetic soil substrate may include non-water soluble open-celled and non-biodegradable material, including, but not limited to, ether-based polyurethane and ester-based polyurethane foams. A synthetic soil substrate may include an organic plant-based biodegradable material, including, but not limited to, soybean extracts, fungi-based materials, and shellfish-based materials. In some embodiments, the synthetic soil substrate may include a felted material, or may consist essentially of a felted material wherein at least 90% of the volume of the synthetic soil substrate is felted material. In some embodiments, the synthetic soil substrate may include a foam, or may consist essentially of a foam, wherein at least 90% of the volume of the synthetic soil substrate is foam. In some embodiments, the synthetic soil substrate may include a printed material, or may consist essentially of a printed material, wherein at least 90% of the volume of the synthetic soil substrate is printed material. A synthetic soil substrate may be an engineered material, a material that is made through a process, such as by foaming, felting, printing and the like, to produce the synthetic soil substrate. A synthetic soil substrate may include functional groups that can provide polar regions within the synthetic soil substrate. The synthetic soil substate may include foam or may consist substantially of a foam.

A synthetic soil substrate assembly may include a number of synthetic soil substrate layers and these layers may be synthetic soil substrate planar layers, extending in a plane, or may be synthetic soil substrate ring layers, extending in a ring wherein the rings are concentric from one layer to an adjacent layer. The plurality of synthetic soil substrate layers may be separate layers retained stacked together, or may be bonded together or may be made through a process whereby the layers are formed in an integral one-piece material, such as through foaming, or three-dimensional printing. The synthetic soil substrate layers may be configured with an average pore size and structure and with an integral growth additive for a particular stage of plant growth, such as a seed layer, a germination layer, a growth layer and a harvest layer. The pore structure and size and the concentration and type of growth additive required may be substantially different from layer to layer. A first layer may have a substantially higher growth additive concentration (20% or more) than a second synthetic soil substrate layer, as determined by a concentration by volume. A seed layer may be configured most proximal to a plant seed, or a plant plug that is inserted into a synthetic soil substrate assembly. A germination layer may be adjacent to the seed layer but distal the seed or plant plug. A growth layer may be adjacent the germination layer that is more proximal to the seed or plant plug. A harvest layer may be adjacent the growth layer that is more proximal to the seed or plant plug. Adjacent, as used herein, means that are directly next to each other and are having mating or touching surfaces. A plant plug, may simply be a seed or seedling, or sprout, or plant, a tuber, a cutting, and may have growth material including, but not limited to soil, a synthetic soil substrate as described herein, including having a growth additive included therein and having an isotropic or anisotropic structure.

Additionally, the arrangement of the density layers may be adjusted to optimize for various stages of growth a plant species might experience in a natural environment. For example, a plant may have different needs at the germination stage than it does at the maturation, flowering, and harvesting stages. The arrangement of the density layers may be adjusted to better accommodate the needs of the plant at its current growth stage. Further, the embodiments disclosed herein allow input/output properties of the synthetic soil substrate to be adjusted to better serve needs of various plant species at various growth stages. In addition, the input/output properties of the adsorptive materials can allow the adsorptive materials to be dissolved efficiently within the structure as a result of the increased surface area of the invention's manufacturing of geometric structures within the synthetic soil substrate.

A synthetic soil substrate system may include barrier layers to manage the delivery and retention of water and growth additives through the synthetic soil assembly. A synthetic soil assembly may include a barrier layer between the synthetic soil substrate layers to control the flow of water and growth additives from one layer to another. It may be desirable to concentrate the water and growth additives in the seed layer initially and then concentration the water and growth additives to the other layers as the roots grow. A barrier layer, such as a coating or a layer of material with controlled permeability to water, such as having controlled porosity or apertures therethrough which may serve to control the distribution of water and growth additives throughout the growth process. The additive plugs may be used to deliver water and growth additives to a specific synthetic soil substrate layer and the barrier layer on either surfaced of this layer may prevent the water and growth additives from flowing or wicking into the adjacent layers. Likewise, a synthetic soil substrate system may include a bulkhead that extend through the thickness of a synthetic soil substrate layer to prevent of control the flow of water and/or growth additives through or along said layer. As with the barrier layer, the bulkhead may be a coating or a layer of material with controlled permeability to water, such as having controlled porosity or apertures therethrough which may serve to control the distribution of water and growth additives throughout the growth process. A barrier layer and/or bulkhead may be a film of material and this material may be biodegradable and configured to dissolve or become more permeable after exposure to an amount of water, or water at an elevated temperature, or a chemical solution specifically prepared to dissolve or degrade the barrier layer or bulkhead.

A synthetic soil substrate system may include additive plugs that are configured in the synthetic soil substrate assembly and are an enhanced and/or tailored delivery structure, for the delivery of water and/or additives. The additive plugs may be configured to be inserted into the synthetic soil substrate assembly as the plant grows. An additive plug may contain or be configured to deliver a growth additive to the synthetic soil substrate assembly and may be configured to deliver or provide the growth additive to a particular synthetic soil substrate layer. An additive plug may have a substantially different average pore size than one or more of the synthetic soil substrate layers it is configured in. Also, an additive plug may have a substantially higher growth additive concentration than a synthetic soil substrate layer it is configured in, wherein a substantially higher growth additive concentration means 20% or more by volume.

An additive plug may have an average pore size that is smaller than the average pore size of the synthetic soil substrate layers and this tighter pore size may enable the additive plug to retain a growth additive therein. A growth additive may be dispensed into an additive plug via an additive dispenser, such as a syringe, and the tight pore size may retain the growth additive therein and alternatively a more open pore size may more effectively disperse the water and growth additive into the synthetic soil substrate. An additive dispenser may penetrate through or into the additive plug to a depth for release of water and/or growth additives into a substrate layer specific for the growth stage.

An additive plug may be cylindrical in shape and may be tapered into the synthetic soil substrate assembly. An additive plug may have a covering to prevent dispersion from a portion of the additive plug and this covering may be solid and impermeable, or permeable to allow a slower delivery of water and growth additives to the substrate. A permeable covering may have pores or aperture to allow flow therethrough.

A growth additive may be a material that promotes growth of the plant and may be a nutrient, a carbon capture material, a pesticide, a herbicide and the like. A growth additive may be configured in the synthetic soil substrate as an integral growth additive or may be added in a solution with water, for example to the synthetic soil substrate or through a additive plug.

A growth additive may be a nutrient, such as nitrogen, phosphorus, potassium, calcium, magnesium, sulfur, iron, zinc, manganese, copper, boron, molybdenum, and chlorine, or any combination thereof. As described herein, the optimal type and amount of nutrients may vary depending the type of plant being grown and the stage of the growth cycle of the plant. Again, the specific type and concentration of nutrients within a synthetic soil substrate layer or additive plug may be tailored for optimal plant growth.

A growth additive may be a carbon capture material including microbes, fungi, biocarbonates, or glomalin. Like the nutrients, the carbon capture material used and the concentration may vary between synthetic soil substrate layer or between additive plugs.

A growth additive may also include herbicides, insecticides, fungicides or binding chemicals. Binding chemicals including those naturally found in soils can be included in the synthetic soil substrate to readily accept plant exudates such as carbon for deposit from the root systems of the plants. The combination of chemically different materials can help provide different absorbent zones for water to collect and be stored in pockets similar to those found in natural soils formations.

The structural geometry and chemistry of the synthetic soil substrate can be engineered to allow for localized water regions in which roots can absorb water for growth. This localization of water allows for a decrease in overall water requirements within the growth system. Furthermore, because water is one of the heaviest aspects of natural soils, by localizing the water, the overall weight of a growth system of the invention can be reduced compared to the weight of a conventional soil system. Consequently, a synthetic soil substrate enables a dramatic reduction in weight over natural soil. Natural soils contain about 45% inorganic material that contain an unorganized dispersion of open areas. A synthetic soil substrate may be designed to have organized dispersion of open areas within the synthetic soil substrate. The benefits of this organized dispersion of open spaces include improved fluid dynamics as well as a reduction in weight and space requirements of the materials. This is particularly useful for transportation because the synthetic soil substrate can be compacted to a smaller size by using a vacuum to evacuate the open spaces.

Additionally, the geometry of the open spaces can be tailored to optimize fluid dynamic properties. For example, the optimal geometric structure for fluid droplets is a sphere of varying micron sizes. The open cell structure of our invention can be chemically manufactured to compliment the outside polar surface of any fluid droplet of any size.

The synthetic soil substrate described herein allows for multiple functional advantages over conventional soils in taking advantage of the fact that for water and other fluids, the optimal geometric structure is often a sphere. The synthetic soil substrate creates complimentary chemical and geometric structures for fluids absorption.

Root physiology requirements of individual species include penetration forces of the growth zone of roots through the soil and through structures such as spheres in order to extract fluid and nutrient requirements. Layers in the synthetic soil substrate and additive plugs along with density selection can be adjusted to optimize the properties based on root physiology and preferred natural soil properties for a particular plant. For example, clay soils are very dense materials and materials can be manufactured to mimic clay densities using the micron size of the synthetic soil substrate.

The ability to manufacture densities into the materials that are similar to those of natural soil environments as well as the ability to manufacture fluid dynamic and absorptive properties tailored to the root physiology of specific species is a significant benefit of the synthetic soil substrate. The use of individual synthetic soil substrate layers and individual plugs can be optimized for specific plants and to mimic nature soils.

The structural features including the geometry of the pores (e.g., the shape and size of the pores) of the synthetic soil substrate as well as the chemical nature of the material further allow for optimal, isolated, localized sequestration of dissolved solutes and micro sized materials. The layering of synthetic soil substrate layers and the plug structure allow for localization of beneficial growth factors as well as the localized deposition of plant waste materials such as carbon. A synthetic soil substrate may be configured to sequester via chemistry and geometric structures a variety of additives as well as plant waste materials. This is accomplished via the chemistry of the synthetic soil substrate as well as the geometric open pores of the synthetic soil substrate.

The synthetic soil substrate disclosed naturally absorb fluids and dissolve solids contained in the fluids. By increasing the surface area of the synthetic soil substrate and chemically complementing binding elements, exudates such as carbon, oxygen, hydrogen and nitrogen can be better absorbed. The geometric structures disclosed allow for the bound materials to be sequestered.

A synthetic soil substrate system may be effective in harsh environments, such as on the International Space Station. The use of zero gravity manufacturing processes may further enhance the benefits of use, particularly where intended for use in a zero-gravity environment. The benefit of structures and geometries made in zero gravity can optimize the chemistry and structural binding of these materials.

A synthetic soil substrate system may be used on land or in water. The vegetation or plant may grow down from the synthetic soil substrate assembly into water, such as salt water. The vegetation may be seaweed and may grow down from, along a side of, or in a central aperture of a synthetic soil substrate.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 3:
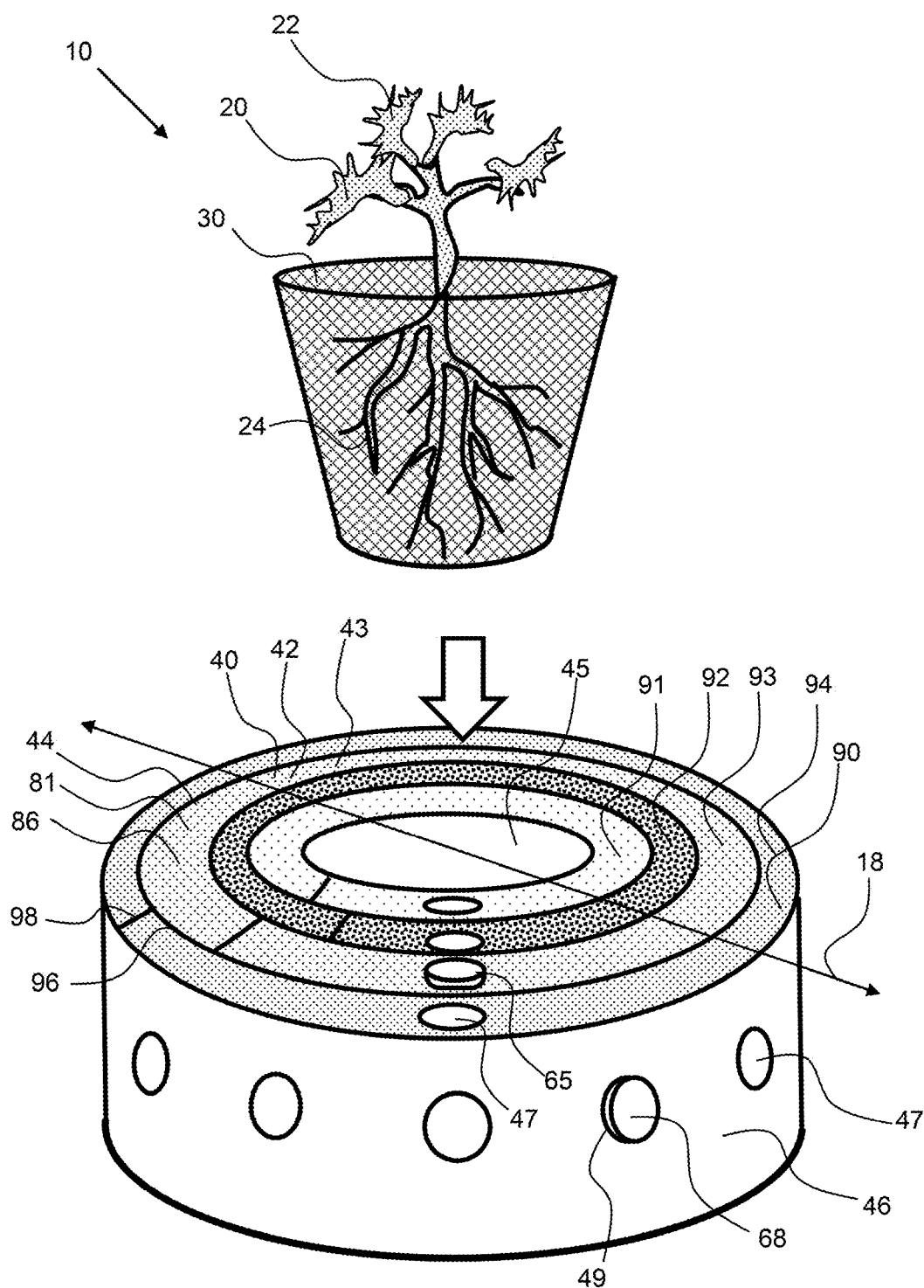

FIG. 3 perspective view of a synthetic soil substrate system having a synthetic soil assembly of a plurality of concentric synthetic soil substrate ring layers and both radial layer plugs and vertical layer plugs for introducing a growth additive, such as nutrients and/or carbon capture material into the synthetic soil assembly.

Figure 4:
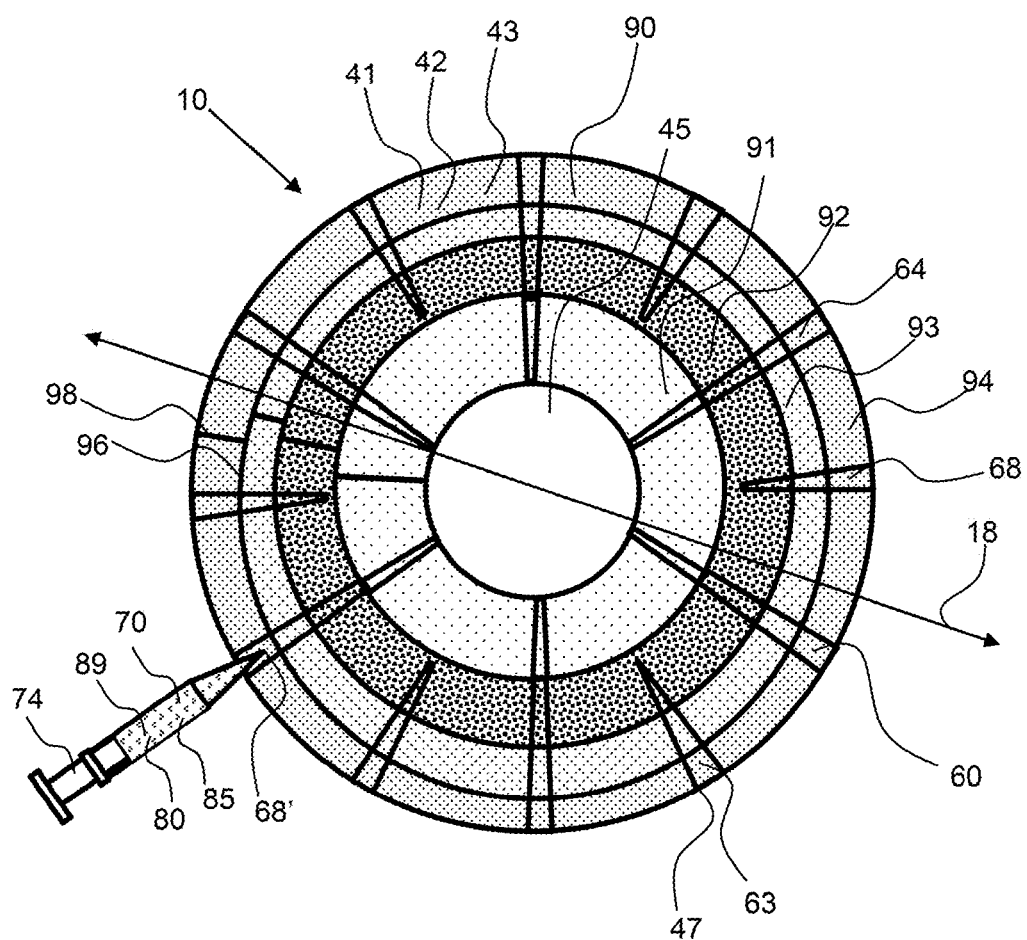

FIG. 4 shows a cross-section view of the synthetic soil substrate system shown in FIG. 3 with an additive dispenser introducing an additive into the synthetic soil assembly.

Figure 5:
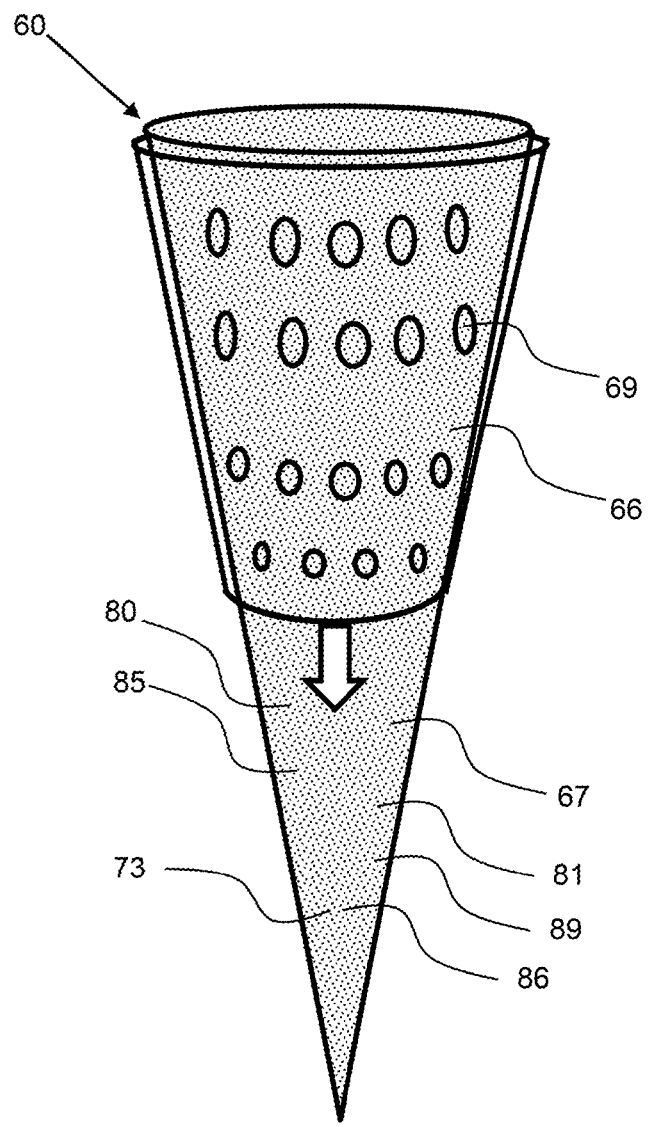

FIG. 5 shows a side view of an additive plug having integral growth additives and a covering to prevent delivery of growth additives from a additive dispenser to some of the layers of a synthetic soil substrate assembly.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
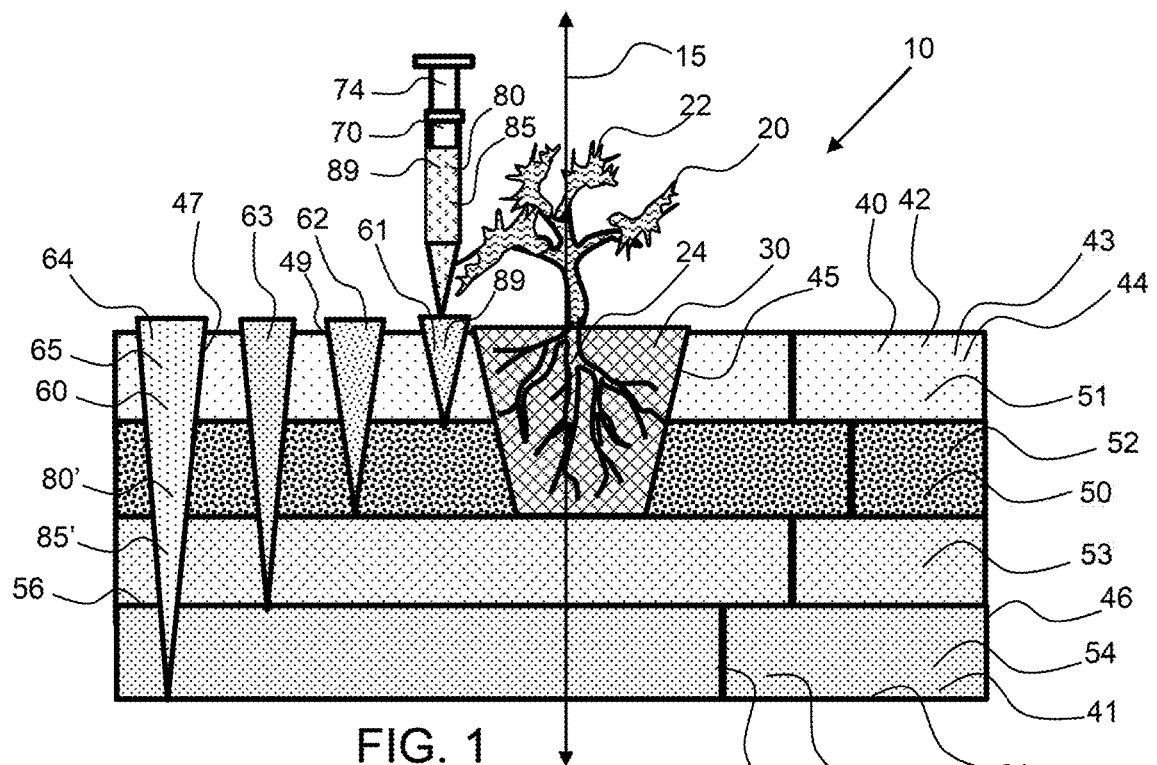
FIG. 1 shows a cross-sectional view of a synthetic soil substrate system having a plurality of synthetic soil substrate layers for receiving and growing a plant and having additive plugs extending into the synthetic soil assembly.
Figure 2:
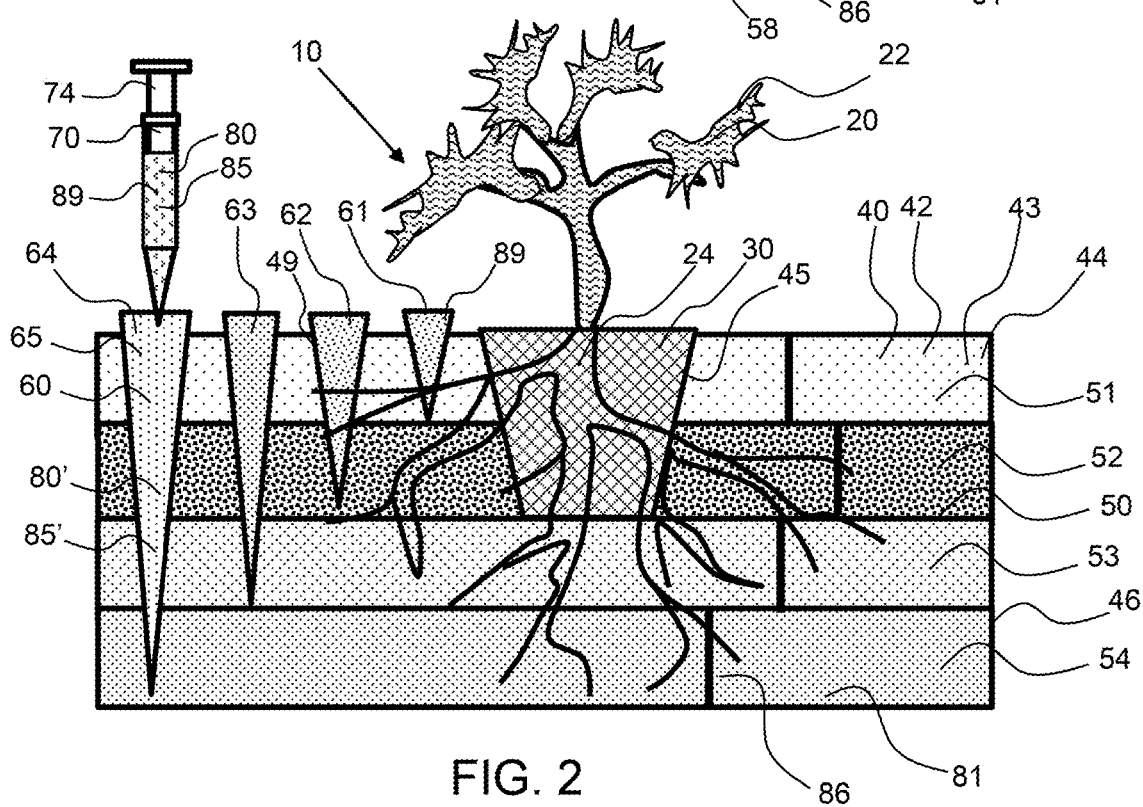
FIG. 2 shows a cross-sectional view of the synthetic soil substrate system shown in FIG. 1, with the plant now grown and the roots of the plant extending into additional layers of the synthetic soil assembly.

Referring to the Figures, a synthetic soil substrate system 10 has a plurality of synthetic soil substrate layers for receiving and growing a plant 20 and additive plugs 60 extending into the synthetic soil assembly 40. As shown in FIGS. 1 and 2, the synthetic soil assembly 40 has a plurality of synthetic soil substrate planar layers 50, that are layered along the vertical axis 15 and extend horizontally with respect to the vertical axis. The plurality of synthetic soil substrate planar layers 50 includes a seed layer 51, a germination layer 52, a growth layer 53 and a harvest layer 54. As described herein, each of these layers may have a different structure, pore size, pore shape, and density, to promote growth as different stages of the plant growth cycle. Each of the synthetic soil layers comprises a synthetic soil substrate 42 having pores 43 and may comprises an integral growth additive 44, such as an integral nutrients 81 and/or integral carbon capture material 86, which may be retained in the pores or as a coating. A retainer 46 may be configured to retain the synthetic soil assembly 40. The synthetic soil substrate 42 may be made of a foam 41.

The synthetic soil assembly 40 has a plant plug aperture 45 for receiving the plant 20 or plant plug 30. The plant has vegetation 22 and roots 24 that grow into the synthetic soil assembly 40. As shown in FIG. 2, the roots 24 of the plant have grown from the plant plug 30 into and through the synthetic soil substrate planar layers 50. As the roots grow, each layer provides a specific structure and/or integral growth additives 44 to promote growth.

The synthetic soil substrate system 10 may include barrier layers to manage the delivery and retention of water and growth additives through the synthetic soil assembly 40. A synthetic soil assembly may include a barrier layer 56 between the synthetic soil substrate planar layers 50 to control the flow of water and growth additives from one layer to another. A barrier layer 56 may be configured on opposing surfaces of the synthetic soil substrate planar layer, or on only one surface, such as the plant surface, the surface most proximal to the plant, or root surface, the surface most distal from the plant or vegetation of the plant. Also, a synthetic soil assembly 40 may include a bulkhead 58 that extends through the thickness of a synthetic soil substrate planar layer to control the flow and dispersion of water and growth additives. A bulkhead is shown through each of the layers and it should be noted that a number of bulkheads may be configured in each layer, on opposing sides of the plant, for example, or multiple bulkheads on either side of the plant 20. Only one bulkhead in each layer shown for ease of illustration.

The synthetic soil substrate system 10 also has additive plugs 60 that include growth additive 89 and/or enable growth additive to be added during the growth cycle of the plant. The synthetic soil assembly 40 may have retainer plug apertures 47 for receiving the additive plugs therein. The additive plugs may have a pore structure to receive and retain growth additives 89, such as nutrients 80 and/or carbon capture material 85. The additive plug may have a smaller average pore size thereby preferentially retaining growth additives and preventing the growth additive from wicking or dispersing into the synthetic soil substrate layers. The additive plug may have a larger average pore size than a surrounding synthetic soil substrate layer, thereby enhancing delivery of water and growth additives into the synthetic soil substrate layer. An additive dispenser 70, such as a syringe 74, may be configured to dispense a growth additive 89, such as a growth additive 89 into the synthetic soil assembly 40. An additive plug 60 may be configured to extend down through one or more of the synthetic soil substrate planar layers 50. A seed plug 61 extends into the seed layer 51, a germination plug 62 extends down into the germination layer 52, a growth plug 63 extends down into the growth layer 53 and the harvest plug 64 extends down into the harvest layer 54. The additive plugs may be configured in a progressive configuration within the synthetic soil assembly with the seed plug configured more proximal to the plant plug 30, than the germination plug 62, and the germination plug configured more proximal to the plant plug than the growth plug 63 and the growth plug configured more proximal to the plant plug than the harvest plug 64. As the roots grow radially outward, they will encounter different synthetic soil substrate ring layers which may have water and/or additives, such as nutrients, provided through radial layer plugs.

The synthetic soil substrate system 10 has barrier layers to manage the delivery and retention of water and growth additives through the synthetic soil assembly 40. A synthetic soil assembly may include a barrier layer 96 between the synthetic soil substrate ring layers 90 to control the flow of water and growth additives from one layer to another. A barrier layer 96 may be configured on opposing surfaces of the synthetic soil substrate ring layer, or on only one surface, such as the plant surface, the surface most proximal to the plant, or root surface, the surface most distal from the plant or vegetation of the plant. Also, a synthetic soil assembly 40 may include a bulkhead 98 that extends through the thickness of a synthetic soil substrate ring layer to control the flow and dispersion of water and growth additives. A bulkhead is shown through each of the ring layers and it should be noted that a number of bulkheads may be configured in each ring layer, around the perimeter of the plant 20, for example. Only one bulkhead in each layer shown for ease of illustration.

The additive plugs may have an outer shell or covering over a portion of the additive plug to direct the growth additive to the desired synthetic soil substrate layer, as detailed in FIG. 5.

Referring now to FIGS. 3 and 4, a synthetic soil substrate system 10 has a synthetic soil assembly 40 including a plurality of concentric synthetic soil substrate ring layers 90 and both radial layer additive plugs 68 extending radially into the synthetic soil assembly 40 and vertical layer plugs 65 extending down into the synthetic soil assembly 40, each for introducing a growth additive 89, such as nutrients and/or carbon capture material into the synthetic soil assembly. The concentric synthetic soil substrate ring layers 90 include an inner ring layer 91, which may a seed layer as it is most proximal to the plant plug, a first ring layer 92 configured concentrically around the inner ring layer, which may be a germination layer, a second ring layer 93 configured concentrically around the first ring layer 92, which may be a growth layer, and an outer ring layer 94 configured concentrically around the second ring layer, which may be a harvest layer. Each of the concentric synthetic soil substrate ring layers 90 comprises or consists of a synthetic soil substrate 42 having pores 43 that may be different for the stage of the plant growth cycle. Each of the synthetic soil layers comprises a synthetic soil substrate 42 that may comprise an integral growth additive 44, such as an integral nutrient 81 and/or integral carbon capture material 86, which may be retained in the pores or as a coating. The synthetic soil substrate system 10 has a vertical layer plug 65 and radial layer additive plug 68 configured in retainer plug apertures 47, 49, respectively. A retainer 46 is configured around the synthetic soil assembly 40 and may have a radial retainer plug aperture 49 for receiving the radial layer additive plug 68 therethrough. A radial axis 18 is shown and the radial layer plugs extend generally into the assembly, radially, or from the outer perimeter toward a center of the synthetic soil substrate assembly 40.

As shown in FIG. 3, the concentric synthetic soil substrate ring layers 90 may be bowl shaped and fit on inside of another and still form concentric layers in the overlap of the bowl shaped concentric synthetic soil substrate ring layers. A bowl will have a bottom or base portion and a side that extends circumferentially around the base that forms a bowl extending away from the base portion. Therefore, a stacked bowl shaped synthetic soil substrate assembly would have a stacked base portion as generally shown in FIGS. 1 and 2 and a side portions as generally shown in FIG. 4.

As shown in FIG. 4, an additive dispenser 70 is dispensing a growth additive 89, such as a nutrient 80 or carbon capture material 85 into the radial layer additive plug 68'. Note that the radial layer additive plug 68' extends from the outer ring layer 94 to the inner ring layer 91, or seed layer. Also, the radial layer plugs may extend into from the outside of the synthetic soil assembly 40 into any of the synthetic soil ring layers. Radial layer additive plug 68 extends into the first ring layer 92.

As shown in FIG. 5, an additive plug 60 may include or be made from a synthetic soil substrate 42 and have pores 67 and a pore structure configured to deliver and/or retain a growth additive 89, such as a nutrient 80 or carbon capture material 85. The additive plug 60 may have integral nutrients 81 and/or integral carbon capture material 86 in the pores 67 or on the structure. The additive plug may be stiff and rigid to enable insertion into the synthetic soil substrate of a synthetic soil substrate assembly. A covering 66 may be configured over a portion of the additive plug 60 to prevent growth additives 89 from being exposed and/or delivered into synthetic soil layers. For example, a harvest plug may be configured to deliver growth additives to a growth layer of a synthetic soil assembly and therefore may have a covering 66 as show to prevent delivery of the growth additives to the layers above the growth layer. The growth additives 89 and water 73, may be preferentially delivered down to the portion of the additive plug without the covering, as indicated by the bold arrow. The covering 66 may have covering apertures 69 to control the release of water 73 and/or growth additives therefrom. The additive plug shown is conical in shape.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A synthetic soil substrate system comprising:
   a) a plurality of synthetic soil substrate layers, each comprising a synthetic soil substrate, said plurality of synthetic soil substrate layers comprising:
      i) a first synthetic soil substrate layer having pores and a first average pore size;
      ii) a second synthetic soil substrate layer having pores a second average pore size;
      wherein the first average pore size is at least 20% different from said second average pore size;
      wherein each of the synthetic soil substrates comprises:
         a nutrient selected from the group consisting of nitrogen, phosphorous, potassium, calcium, magnesium, sulfur, iron, zinc, manganese, copper, boron, molybdenum and chlorine, and wherein the first synthetic soil substrate layer has a first nutrient composition comprising one or more of said nutrients and wherein the second synthetic soil substrate has a second nutrient composition comprising one or more of said nutrients that is different from the first nutrient composition; and b) a plant plug aperture extending through the first synthetic soil substrate and configured to receive a plant plug.

2. The synthetic soil substrate system of claim 1, wherein the first synthetic soil substrate layer and the second synthetic soil substrate layer are concentric synthetic soil substrate ring layers.

3. The synthetic soil substrate system of claim 2, wherein the first synthetic soil substrate layer and the second synthetic soil substrate layer are bowl shaped, wherein the first synthetic soil substrate layer fits within the second synthetic soil substrate layer.

4. The synthetic soil substrate system of claim 3, wherein the plant plug is configured to fit within the bowl shaped first synthetic soil substrate layer.

5. The synthetic soil substrate system of claim 1, further comprising an additive plug that extends into the synthetic soil substrate system and configured to provide a growth additive to said synthetic soil substrate system.

6. The synthetic soil substrate system of claim 5, wherein the additive plug extends only into the first synthetic soil substrate layer.

7. The synthetic soil substrate system of claim 5, wherein the additive plug comprises an integral growth additive.

8. The synthetic soil substrate system of claim 5, wherein the growth additive of the additive plug is dispensed into the additive plug by an additive dispenser.

9. The synthetic soil substrate system of claim 5, wherein the first synthetic soil substrate layer and the second synthetic soil substrate layer are concentric synthetic soil substrate ring layers and wherein the additive plug extends radially into the synthetic soil substrate system.

10. The synthetic soil substrate system of claim 1, wherein the first synthetic soil substrate layer comprises a barrier layer configured between the first synthetic soil substrate layer and the second synthetic soil substrate layer, and wherein the barrier layer is a barrier to a flow of water from the first synthetic soil substrate layer to the second synthetic soil substrate layer.

11. The synthetic soil substrate system of claim 10, the first synthetic soil substrate layer comprises another barrier layer on an opposing side from said second synthetic soil substrate layer.

12. The synthetic soil substrate system of claim 10, wherein the barrier layer is a coating.

13. The synthetic soil substrate system of claim 10, wherein the barrier layer is a film of material.

14. The synthetic soil substrate system of claim 10, wherein the barrier layer is biodegradable material.

15. The synthetic soil substrate system of claim 10, wherein the first synthetic soil substrate layer comprises a bulkhead extending through a thickness of the first synthetic soil substrate layer, wherein the bulkhead is a barrier to a flow of water therethrough.

16. The synthetic soil substrate system of claim 1, wherein the synthetic soil substrate is a foam.

17. The synthetic soil substrate system of claim 1, wherein the synthetic soil substrate is an engineered material selected from the group consisting of foam, printed material, and felted material.

18. The synthetic soil substrate system of claim 1, wherein the synthetic soil substrate has pores having a pore structure comprising shapes selected from the group of 20-sided icosahedrons, 12-sided dodecahedrons, 8-sided octahedrons, 6-sided cubes and 4 sided tetrahedrons.

19. The synthetic soil substrate system of claim 1, wherein the synthetic soil substrate is made of a biodegradable substrate material.

20. The synthetic soil substrate system of claim 1, wherein the synthetic soil substrate comprises an integral growth additive.

* * * * *